United States Patent [19]

Jinnai

[11] Patent Number: 5,264,921
[45] Date of Patent: Nov. 23, 1993

[54] WHITE BALANCE INCLUDING MEANS FOR PREVENTING COLORED OBJECT FROM DISTURBING THE BALANCE

[75] Inventor: Shigeru Jinnai, Kanagawa, Japan

[73] Assignee: Canon Kabushiki Kaisha, Tokyo, Japan

[21] Appl. No.: 873,671

[22] Filed: Apr. 23, 1992

Related U.S. Application Data

[63] Continuation of Ser. No. 561,929, Aug. 2, 1990, abandoned, which is a continuation of Ser. No. 274,376, Nov. 21, 1988, abandoned.

[30] Foreign Application Priority Data

Nov. 30, 1987 [JP] Japan .............................. 62-300261
Nov. 30, 1987 [JP] Japan .............................. 62-300262

[51] Int. Cl.$^5$ .............................................. H04N 9/73
[52] U.S. Cl. ...................................................... 358/29
[58] Field of Search ................................ 358/29, 29 C

[56] References Cited

U.S. PATENT DOCUMENTS

| 4,739,393 | 4/1988 | Seki et al. ........................... 358/29 C |
| 4,774,564 | 9/1988 | Konishi .............................. 358/29 C |
| 4,797,733 | 1/1989 | Takagi et al. ....................... 358/29 C |
| 4,814,864 | 3/1989 | Pritchard ............................ 358/29 C |
| 4,855,814 | 8/1989 | Shiraishi et al. ................... 358/29 C |

*Primary Examiner*—Mark R. Powell
*Attorney, Agent, or Firm*—Robin, Blecker, Daley & Driscoll

[57] ABSTRACT

An image sensing apparatus for sensing an image of an object and for forming and outputting a color image signal corresponding to the sensed image of the object, in which at the time of adjustment of levels of color signal components of the color image signal formed by sensing the object, a level adjusting range of the color signal component of the color image signal is controlled on the basis of one kind of control information data depending on the level of the color signal component of the color image signal, among a plurality of kinds of control information data provided for setting a plurality of kinds of level adjusting ranges of said color signal component. This arrangement ensures proper white balance adjustment at any time, irrespective of the condition of the object.

12 Claims, 4 Drawing Sheets

WHITE BALANCE INCLUDING MEANS FOR PREVENTING COLORED OBJECT FROM DISTURBING THE BALANCE

This is a continuation application under 37 CFR 1.62 of prior application Ser. No. 561,929, filed Aug. 2, 1990, which is a continuation of prior application Ser. No. 274,376, filed on Nov. 21, 1988, both now abandoned.

FIELD OF THE INVENTION

This invention relates to an image sensing apparatus which senses an image of an object to be photographed and is arranged to form and produce a color image signal corresponding to the image of the object.

DESCRIPTION OF THE RELATED ART

There has been known a technique for automatically adjusting the white balance of an image sensing apparatus such as color video camera on the basis of the signal output of an image sensor. The automatic white balance adjustment is accomplished, for example, by automatically controlling amplification factors for R and B signals produced by the image sensor in such a way as to bring closer to a given reference value the integration values of color-difference signals obtained by converting R, G and B signals produced by the image sensor.

However, in a case where a major part of the image sensing plane of the color video camera is occupied by the color of some object such as the image of a colored object or an object in front of a colored wall obtained in close-up shooting with the color video camera, the adoption of the above stated automatic white balance adjustment method results in white balance adjustment to an unnatural color. For example, if the white balance adjustment deviates toward green or cyan, the color thus obtained is greatly disagreeable to the human eye in terms of visual sensation. It has been therefore, considered very important for the automatic white balance adjustment to solve this problem.

SUMMARY OF THE INVENTION

It is an object of this invention to provide an image sensing apparatus which is capable of solving the above stated problem of the prior art.

It is another object of the invention to provide an image sensing apparatus which is capable of always appositely carrying out white balance adjustment irrespective of the condition of the object to be photographed.

Under this object, an image sensing apparatus which is arranged as an embodiment of this invention to sense an image of a photographed object and to form and produce a color image signal corresponding to the sensed image of the object comprises: image sensing means for sensing the image of the object to generate the color image signal; level adjusting means for adjusting levels of color signal components of the color image signal generated by the image sensing means to output the color signal components whose levels have been adjusted; and control means for controlling a level adjusting action of the level adjusting means on the levels of the color signal components on the basis of one kind of control information data among a plurality of kinds of control information data provided for controlling the level adjusting action of the level adjusting means to be performed within respective different ranges.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
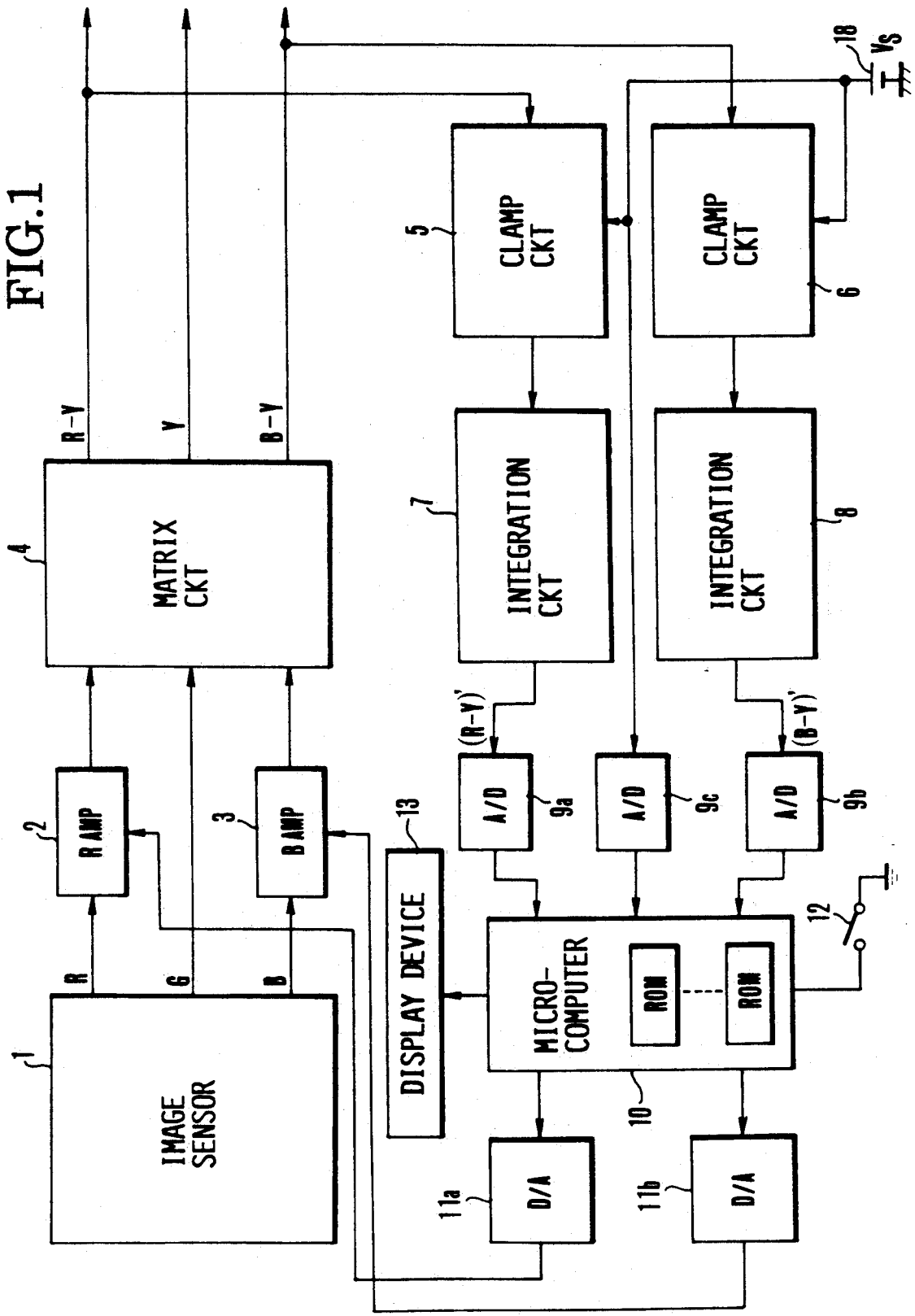
FIG. 1 is a block diagram showing in outline the white balance adjusting arrangement of a color video camera to which this invention is applied as a first embodiment thereof.

The following describes the details of this invention through embodiments thereof:

FIG. 1 is a block diagram showing in outline a white balance adjusting arrangement included in a color video camera to which this invention is applied as a first embodiment thereof. Referring to FIG. 1, the illustration includes an image sensor 1; a variable gain amplifier 2 which is arranged to amplify a (red) signal coming from the image sensor 1 (hereinafter referred to as R amplifier); a variable gain amplifier 3 which is arranged to amplify a B (blue) signal coming from the image sensor 1 (hereinafter referred to as B amplifier); a matrix circuit 4 which is arranged to form color-difference signals R-Y and B-Y and a luminance signal Y from R, G (green) and B signals produced by the image sensor 1; clamp circuits 5 and 6 which are arranged to clamp the blanking levels of the color-difference signals R-Y and B-Y to a reference voltage $V_S$; a reference voltage source 18 which is arranged to generate the reference voltage $V_S$; integration circuits 7 and 8 which are arranged to average the color-difference signals R-Y and B-Y coming from the clamp circuits 5 and 6, respectively; analog-to-digital (A/D) converters 9a, 9b and 9c which are arranged to convert the integration outputs (R-Y)' and (B-Y)' of the integration circuits 7 and 8 and the reference voltage $V_S$ output from the reference voltage source 18 into digital signals; and a microcomputer 10 which is arranged to process signals in accordance with procedures shown in the flow chart of FIG. 2. The microcomputer 10 has a plurality of ROM (Read Only Memory) tables previously storing different white balance adjustable ranges which are provided for different photographing modes respectively.

In the case of this embodiment, there are provided a plurality of photographing modes for coping with the different colors of light sources as those of objects to be photographed. These photographing modes include, for example, a daylight mode for shooting under a daylight condition, a tungsten light mode for shooting under a tungsten light condition, a fluorescent lamp mode for shooting under a fluorescent lamp light condition; a portrait mode for a close-up shot of the face of some person; etc. Different white balance adjustable ranges are provided for the respective photographing modes and are stored by the plurality of ROM tables. One of the ROM tables is selectable by the operator of the color video camera according to a photographing mode selected by means of a switch 12 which will be described later.

The illustration of FIG. 1 further includes digital-to-analog (D/A) converters 11a and 11b which are arranged to convert the digital outputs of the microcomputer 10 into gain control analog signals for controlling the gain of the R amplifier 2 and that of the B amplifier 3 respectively; the above stated switch 12 which is arranged to permit selection of one of the plurality of ROM tables provided within the microcomputer 10; and a display device 13 which makes a display corresponding to the ROM table selected by the switch 12 and being currently in use. The display thus made by the display device 13 shows the photographing mode currently selected.

Figure 2:
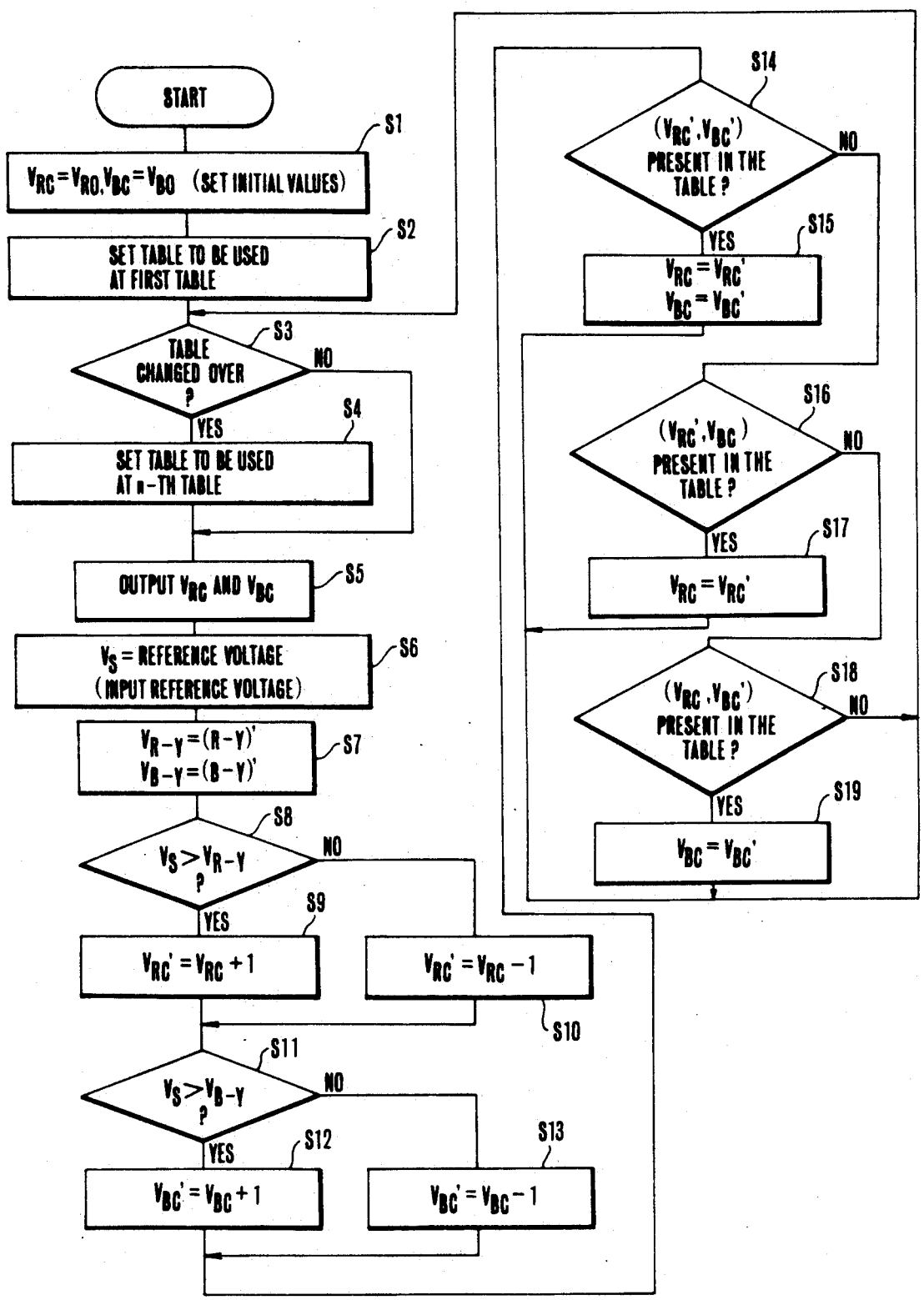
FIG. 2 is a flow chart showing procedures for the control operation of a microcomputer which is included in FIG. 1.

FIG. 2 is a flow chart showing procedures for the control operation of the microcomputer 10. Referring to the flowchart, the operation of the arrangement shown in FIG. 1 is described as follows: First, the power supply of the color video camera shown in FIG. 1 is switched on. Then, at a step S1: The initial values of gain control signals $V_{RC}$ and $V_{BC}$ for controlling the gain of the R amplifier 2 and that of the B amplifier 3 are set at predetermined values $V_{RO}$ and $V_{BO}$ respectively. At a step S2: One of the tables of the microcomputer 10 is selected to be used as a first table. The display device 13 makes a display indicating that the first table is in use. At a step S3: The switch 12 which is provided for change-over of the tables is checked to see if it has been pushed. If not, the flow of operation comes to a step S5. If it is found to have been pushed, the flow comes to a step S4 to change the use of the table from the table currently in use over to a next table and then comes to the step S5. In case that the table currently in use happens to be the last table at the step S4, the use of the table comes back to the first table. Then, the display device 13 makes a display showing which of the tables is currently in use.

At the step S5: The gain control signals $V_{RC}$ and $V_{BC}$ which have been initially set as mentioned above are supplied via the D/A converters 11a and 11b to the R amplifier 2 and the B amplifier 3, respectively. At a step S6: The reference voltage $V_S$ is read via the A/D converter 9c. At a step S7: The integration outputs (R-Y)' and (B-Y)' of the integration circuits 7 and 8 are input via the A/D converters 9a and 9b to be used as integrated values $V_{R-Y}$ and $V_{B-Y}$ of color-difference signals, respectively. At a step S8: A check is made to see if the integrated color-difference signal value $V_{R-Y}$ is equal to or greater than the reference voltage $V_S$. If the integrated value $V_{R-Y}$ is found to be equal to or greater than the reference voltage $V_S$, the flow of operation comes to a step S10 to set a value $V_{RC}-1$ as a setting value $V_{RC}'$. If the former is found to be less than the latter, the flow comes to a step S9 to set a value $V_{RC}+1$ as the setting value $V_{RC}'$. At a step S11: A check is made to see if the other color-difference signal integrated value $V_{B-Y}$ is equal to or greater than the reference voltage $V_S$. If the integrated value $V_{B-Y}$ is found to be equal to or greater than the reference voltage $V_S$, the flow comes to a step S13 to set a value $V_{BC}-1$ as a setting value $V_{BC}'$. If the former is found to be less than the latter, the flow comes to a step S12 to set a value $V_{BC}+1$ as the setting value $V_{BC}'$.

At a step S14: The table which is currently in use among others is checked to see if a combination of the setting values $V_{RC}'$ and $V_{BC}'$ is present in the table. If so, the flow comes to a step S15 to have the values of the gain control signals $V_{RC}$ and $V_{BC}$ which have been initially set changed to the setting values $V_{RC}'$ and $V_{BC}'$. respectively. If not, the flow comes to a step S16 to make a further check to see if a combination of the setting value $V_{RC}'$ and the initially set values $V_{BC}$ is present in the table currently in use. If so, the flow comes to a step S17 to change the gain control signal $V_{RC}$ from the initially set value to the setting value $V_{RC}'$, while the value $V_{BC}$ is left unchanged. If the combination of the values $V_{RC}'$ and $V_{BC}$ is found to be not present in the current table at the step S16, the flow comes to a step S18. At the step S18: A check is made to see if a combination of the initially set value $V_{RC}$ and the setting value $V_{BC}'$ is present in the current table. If so, the flow comes to a step S19 to change the gain control signal $V_{BC}$ from the initially set value to the setting value $V_{BC}'$, while the value $V_{RC}$ is left unchanged. If the combination of the values $V_{RC}$ and $V_{BC}'$ is found to be not present in the current table at the step S18, the flow comes back to the step S3 without changing the values of both the gain control signals $V_{RC}$ and $V_{BC}$. After completion of the step S15, S17 or S19, that is, after the values of the gain control signals $V_{RC}$ and $V_{BC}$ have been determined, the flow comes back to the step S3 to repeat the processes of the steps S3 to S19. Therefore, the steps S3 to S19 are repeatedly executed every time the switch 12 is turned on and off to change the use of the tables from one over to another. This enables the embodiment to make optimum white balance adjustment for each of the above stated different photographing modes.

Figure 3:
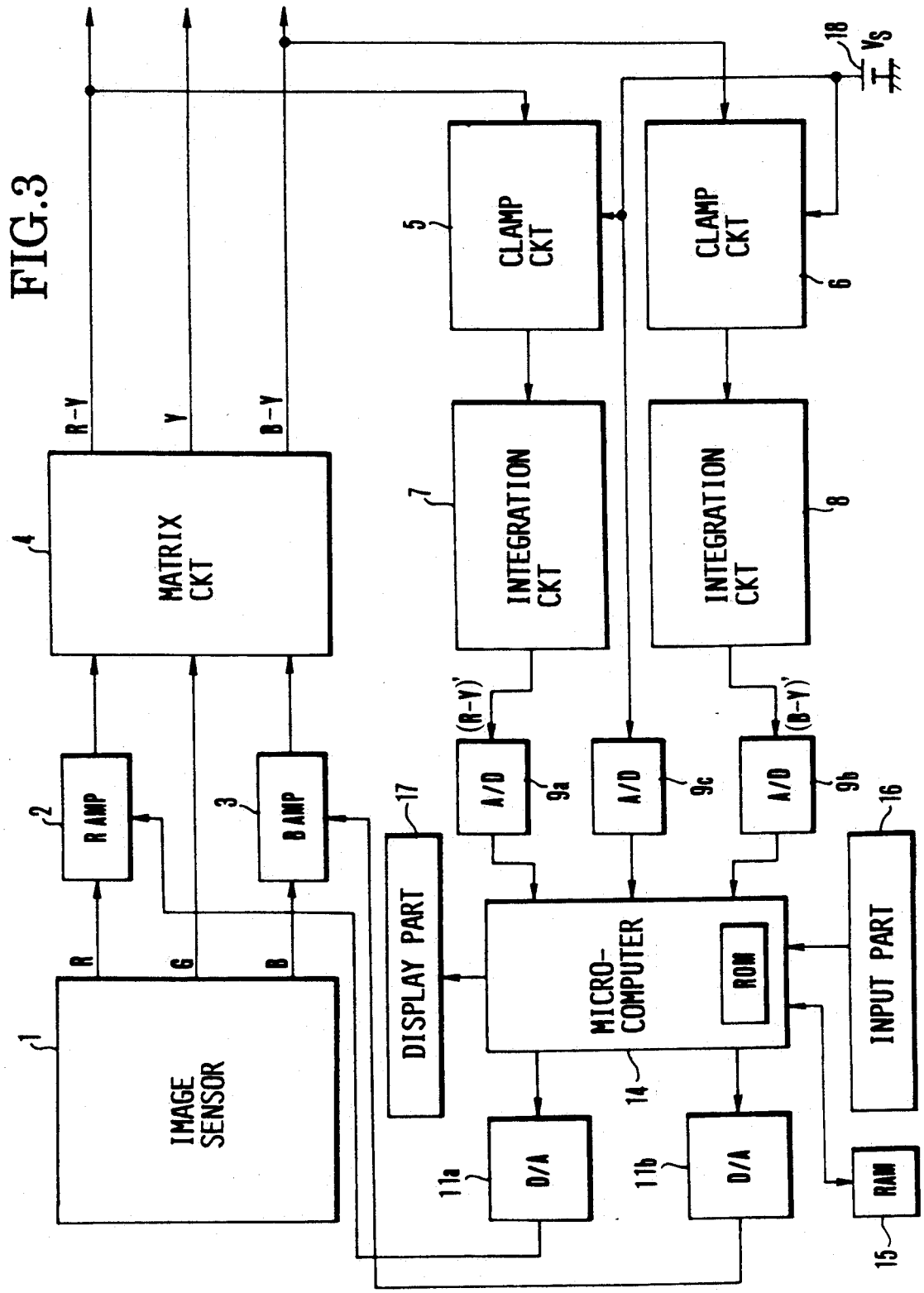
FIG. 3 is a block diagram showing in outline the white balance adjusting arrangement of a color video camera to which the invention is applied as a second embodiment thereof.

FIG. 3 is a block diagram showing in outline the white balance adjusting arrangement of a color video camera to which this invention is applied as a second embodiment thereof. In FIG. 3, the same component parts as those of FIG. 1 are indicated by the same reference numerals as in FIG. 1 and the details of them are omitted from the following description. Referring to FIG. 3, a microcomputer 14 is arranged to operate in accordance with procedures shown in FIG. 4 which is a flow chart. Like in the case of the first embodiment described in the foregoing, information conversion tables for white balance adjustment to be made in different photographing modes are stored by a ROM (Read Only Memory) disposed within the microcomputer 14. A RAM (Random Access Memory) 15 is arranged to store the information conversion table stored by the ROM of the microcomputer 14. The microcomputer 14 changes the information conversion table stored within the RAM 15 on the basis of change information provided from an input part 16 for changing the range of the white balance adjustment. A display part 17 is arranged to make a display corresponding to the changed value of the information conversion table. The display made by the display part 17 shows a currently selected photographing mode.

Figure 4:
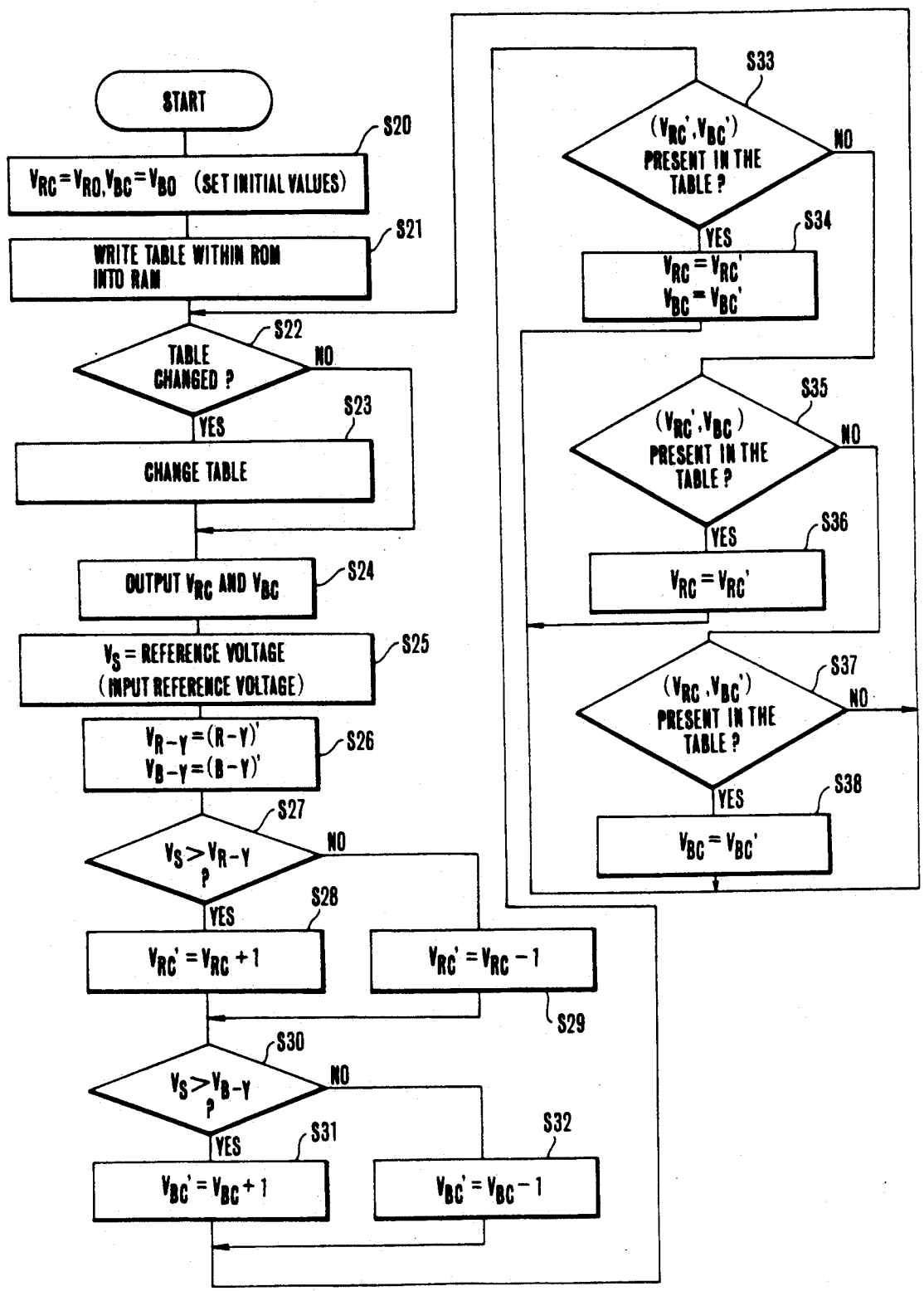
FIG. 4 is a flow chart showing procedures for the control operation of a microcomputer which is included in FIG. 3.

FIG. 4 is a flow chart showing the procedures of the control operation of the microcomputer 14. The operation of the embodiment which is arranged as shown in FIG. 3 is as described below with reference to the flow chart:

At a step S20: When the power supply of the color video camera which is not shown is switched on, the gain control signals $V_{RC}$ and $V_{BC}$ which are provided for controlling the gains of the R and B amplifiers 2 and 3 are set at predetermined initial values $V_{RO}$ and $V_{BO}$. At a step S21: The information conversion table within the microcomputer 14 is stored in the RAM 15.

At a step S22: A check is made to see if the table has been changed. If it is thus found that no change information for a change has been input from the input part 16, the flow comes to a step S24. If change information for a change is found to have been input, the flow proceeds to a step S23 to change the information conversion table within the RAM 15 according to the change information. In this instance, the value of the currently used table is displayed by the display part 17 and then the flow comes to the step S24.

At the step S24: Gain control signals $V_{RC}$ and $V_{BC}$ which have been initially set are supplied via the D/A converters 11a and 11b to the R and B amplifiers 2 and 3, respectively. At a step S25: The reference voltage $V_S$ is read via the A/D converter 9c. At a step S26: The integration outputs (R-Y)' and (B-Y)' of the integration circuits 7 and 8 are input via the A/D converters 9a and 9b to be used as integrated values $V_{R-Y}$ and $V_{B-Y}$. At a step S27: The integrated value $V_{R-Y}$ of one of the color-difference signals is checked to see if it is equal to or greater than the reference voltage $V_S$. If the integrated value $V_{R-Y}$ is found to be equal to or greater than the reference voltage $V_S$, the flow comes to a step S29 to set a value $V_{RC}-1$ as a setting value $V_{RC}'$. If the integrated value $V_{R-Y}$ is found to be less than the reference voltage $V_S$, the flow comes to a step S28 to set a value $V_{RC}+1$ as the setting value $V_{RC}'$. At a step S30: The integrated value $V_{B-Y}$ of the other color-difference signal is checked to see if it is equal to or greater than the reference voltage $V_S$. If so, the flow comes to a step S32 to set a value $V_{BC}-1$ as a setting value $V_{BC}'$. It the former is found to be less than the latter, the flow comes to a step S31 to set a value $V_{BC}+1$ as the setting value $V_{BC}'$.

At a step S33: The currently used table is checked to see if a combination of the setting values $V_{RC}'$ and $V_{BC}'$ is present in the current table. If the combination is found to be present in the current table, the flow comes to a step S34 to have the values of the gain control signals $V_{RC}$ and $V_{BC}$ which have been initially set changed to the setting values $V_{RC}'$ and $V_{BC}'$. If not, the flow comes to a step S35 to make a further check to see if a combination of the setting value $V_{RC}'$ and the initially set value $V_{BC}$ is present in the current table. If so, the flow proceeds to a step S36 to change the value of the gain control signal $V_{RC}$ to the setting value $V_{RC}'$, while the initially set value $V_{BC}$ is left unchanged. Further, if the combination of the values $V_{RC}'$ and $V_{BC}$ is found to be not present in the current table at the step S35, the flow comes to a step S37. At the step S37: A combination of the other initial set value $V_{RC}$ and the setting value $V_{BC}'$ is checked to see if it is present in the current table. If so, the flow proceeds to a step S38 to have the value of the gain control signal $V_{BC}$ has been initially set changed to the setting value $V_{BC}'$, while the other initially set value $V_{RC}$ is left unchanged. If the combination of the values $V_{RC}$ and $V_{BC}'$ is found to be not present in the current table at the step S37, the flow comes back to the step S22 without changing the values of both the gain control signals $V_{RC}$ and $V_{BC}$. After completion of the step S34, S36 or S38, that is, after the values of the gain control signals $V_{RC}$ and $V_{BC}$ have been determined, the flow comes back to the step S22 to repeat the steps S22 to S38. The steps S22 to S38 are thus repeatedly executed every time the input part 16 produces an instruction for a change in the use of the tables from one over to another. This arrangement, therefore, enables the embodiment to make optimum white balance adjustment for every one of the above stated various photographing modes.

The embodiments described above are capable of accomplishing always the optimum white balance adjustment irrespective of the kind of the light source and that of the object to be photographed.

What is claimed is:

1. An image sensing apparatus, comprising:
   (a) image sensing means for sensing an image of an object to form an image signal which includes a plurality of color signal components;
   (b) a plurality of level adjusting means for adjusting levels of the plurality of color signal components;
   (c) control signal forming means for forming a plurality of control signals to control said plurality of level adjusting means by using the color signal components levels of which are adjusted by said plurality of level adjusting means;
   (d) limiting means for limiting a combination of the control signals within a limitative area which determines an area in a space corresponding to all combinations of the control signals, said plurality of level adjusting means being controlled by the control signals limited by said limiting means; and
   (e) manually operable setting means for changeably setting the limitative area.

2. An apparatus according to claim 1, wherein said setting means includes a plurality of memories which memorize data corresponding to the limitative areas in the space which are different from each other and a selection means for selecting a memory among the plurality of memories, and wherein said limiting means operates according to the memory selected by said selection means.

3. An apparatus according to claim 1, wherein said limiting means includes discrimination means for discriminating whether or not the combination of control signals formed by said control signal forming means is within said limitative area, and correction means for correcting the control signals in response to an output of said discrimination means.

4. An image sensing apparatus, comprising:
   (a) image sensing means for sensing an image of an object to form an image signal which includes a plurality of color signal components;
   (b) a plurality of level adjusting means for adjusting levels of the plurality of color signal components;
   (c) control signal forming mean for forming a plurality of control signals to control said plurality of level adjusting means by using the color signal components levels which are adjusted by said plurality of level adjusting means;
   (e) manually operable setting means for changeably setting an area of a combination of the control signals, the area being determined in a space corresponding to all combinations of the control signals;
   (f) discrimination means for discriminating whether or not the combination of the control signals formed by said control signal forming means is within the area set by said setting means; and
   (g) correction means for correcting the control signals in response to an output of said discrimination means.

5. An apparatus according to claim 4, wherein said setting means includes a plurality of memories which memorize data corresponding to correction characteristics different from each other and a selection means for selecting a memory among the plurality of memories, and wherein said discrimination means and said correction means operate according to the data memorized in the memory selected by said selection means.

6. An image sensing apparatus, comprising;
   (a) image sensing means for sensing an image signal which includes first and second color signal components;
   (b) first adjusting means for adjusting a level of the first color signal component;
   (c) second adjusting means for adjusting a level of the second color signal component;
   (d) first control means for forming a first control signal to control said first adjusting means within a first control range by using the first signal component level which is adjusted by said first adjusting means;
   (e) second control means for forming a second control signal to control said second adjusting means within a second control range by using the second signal component level which is adjusted by said first adjusting means; and
   (f) manually operable setting means for changeably setting the first and second control ranges respectively.

7. An apparatus according to claim 6, wherein said first control means includes first limiting means for limiting the first control signal within the first control range, said second control means includes second limiting means for limiting the second control signal within the second control range, and wherein said first and second adjusting means are controlled by the first and second control signals limited by said first and second limiting means.

8. An image sensing apparatus, comprising:
   (a) image sensing means for sensing an image of an object to form an image signal which includes a plurality of color signal components;
   (b) level adjusting means for adjusting levels of the plurality of color signal components;
   (c) control signal forming means for forming a control signal to control said level adjusting means within a control range according to color temperature of the object; and
   (d) manually operable means for selecting the control range of said control signal forming means among a plurality of predetermined control ranges in response to a manual operation.

9. An apparatus according to claim 8, wherein said plurality of predetermined control ranges differ from one another and wherein said control range selection means includes a plurality of memories which store the plurality of predetermined control ranges, wherein a selection means provides for selecting a memory among the plurality of memories, and wherein said control signal forming means operates by using to the memory selected by said selection means.

10. An apparatus according to claim 8, wherein said control signal forming means includes limiting means for limiting the control signal within the control range, said level adjusting means being controlled by control signal limited by said limiting means.

11. An apparatus according to claim 8, wherein said control signal forming means includes discrimination means for discriminating whether or not the control signal is within the control range and correction means for correcting the control signal in response to an output of said discrimination means.

12. An image sensing apparatus, comprising:
   (a) image sensing means for sensing an image of an object to form an image signal which includes a plurality of color signal components;
   (b) level adjusting means for adjusting levels of the plurality of color signal components; and
   (c) control signal forming means for forming a control signal to control said level adjusting means within a control range according to a color temperature of the object, said control signal forming means including a plurality of memories which memorize data corresponding to control characteristics different from each other and a manually operable selection means for selecting a memory among the plurality of memories, and said control signal forming means forming the control signal according to data memorized in the memory selected by said selection means.

* * * * *